United States Patent [19]

Kohaut

[11] Patent Number: 4,493,173
[45] Date of Patent: Jan. 15, 1985

[54] AUTOMATIC CABLE PASSAGE CLOSURE AND SEALING DEVICE

[75] Inventor: John E. Kohaut, West Orange, N.J.

[73] Assignee: Raceway Components, Inc., Nutley, N.J.

[21] Appl. No.: 227,799

[22] Filed: Jan. 23, 1981

[51] Int. Cl.³ .............................................. H02G 3/22
[52] U.S. Cl. .......................................... 52/221; 52/1; 52/219; 52/232; 174/48
[58] Field of Search ...................... 52/221, 220, 232, 1, 52/219, 317; 169/48; 174/48; 277/26

[56] References Cited

U.S. PATENT DOCUMENTS

| | | | |
|---|---|---|---|
| 3,864,883 | 2/1975 | McMarlin | 52/221 |
| 3,995,102 | 11/1976 | Kohaut | 52/232 X |
| 4,061,344 | 12/1977 | Bradley et al. | 52/232 X |
| 4,109,423 | 8/1978 | Perrain | 52/232 X |
| 4,249,353 | 2/1981 | Berry | 52/232 |
| 4,270,318 | 6/1981 | Carroll et al. | 52/221 X |

*Primary Examiner*—J. Karl Bell
*Attorney, Agent, or Firm*—Howard N. Sommers

[57] ABSTRACT

An automatic electric cable passage closure and sealing device, for positioning in an opening in a structure such as a floor or wall, etc., for passing or connecting a cable or cables and cable conduits therethrough, the device automatically expanding and sealing itself and the cables and cable conduits in the structural opening on occurrence of excess heat or fire. The device comprises a hollow conducting casing to be positioned in a cable or conduit passage in the structure, said casing having novel means effectuating automatic movement and expansion of intumescing, fire retarding, means on occurrence of fire or highly elevated temperatures, said intumescing means pressing through the cables insulation and onto the conductor wires interiorly of the cables. Said wires are thereby automatically sealed in the casing, and in the structure, said intumescing means expanding in and around the casing, completely filling the casing and the floor or wall opening wherein the casing is positioned, automatically forming a unitary and continuous closure of the structure wherein the device is positioned, preventing passage of heat or flames therethrough.

33 Claims, 11 Drawing Figures

AUTOMATIC CABLE PASSAGE CLOSURE AND SEALING DEVICE

BACKGROUND OF THE INVENTION

This invention relates to the problems encountered in passage of communication, power and other cables, wires and conduits therefor through openings in cement or other material structural members for connection of said cables or conduits, from cable raceways or other sources, to lighting, communication, electronic and other fixtures and devices. Such cables are conventionally formed with center cores of wire, tape, or other center material, enclosed in insulation. Insulation, adequate at room temperature, burns off and exposes center cores of cables and wires at the greatly elevated temperatures that occur in the case of fires. Thus spaces and openings are formed for ready passage of excess heat, smoke and flames, on occurrence of fires or highly elevated temperatures. In practice, therefor, devices through which cables pass heretofore provided ready and effective passageways or chimneys for smoke, flames and excess heat, with resultant great loss of life and property. In addition to such serious consequences through cable passage devices on burning off the insulation of cables and wires, heat, smoke and flames, once started, move and flow with increasing rapidity, accelerating, in a domino effect, from floor to floor, and defying efforts to contain or stop it, multiplying the risk of injury and loss of life to persons in the building as well as to fire fighting personnel.

Such dangerous fire conditions are further aggravated when plastic cable conduit, which, in many installations, is more convenient and time saving than metal, and less costly, is used. Such plastic cable conduit, efficient at room temperatures, readily burns at highly elevated temperatures. Steel cable conduit readily conducts heat and thus also serves to aid the progress of fire and excess temperatures.

The device of this invention overcomes the foregoing and other deficiencies in prior art devices by providing automatic, efficient and effective means for sealing cables in a wall, floor or other structure on occurrence of fire or highly elevated temperatures, thus assuring safety in use and operation and enhancing the fire and safety ratings of the structures wherein the invention is utilized.

DESCRIPTION OF THE DRAWINGS

In the drawings, exemplifying the invention, and wherein similar reference characters indicate like parts, FIG. 3 A is a similar view of another form.

DESCRIPTION OF PREFERRED FORM OF THE INVENTION

Figure 2:
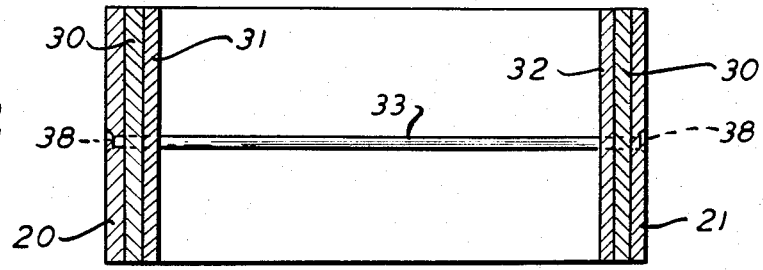
FIG. 2 is a vertical elevational, partly sectional view, taken on line 2—2 of FIG. 1.
Figure 3:
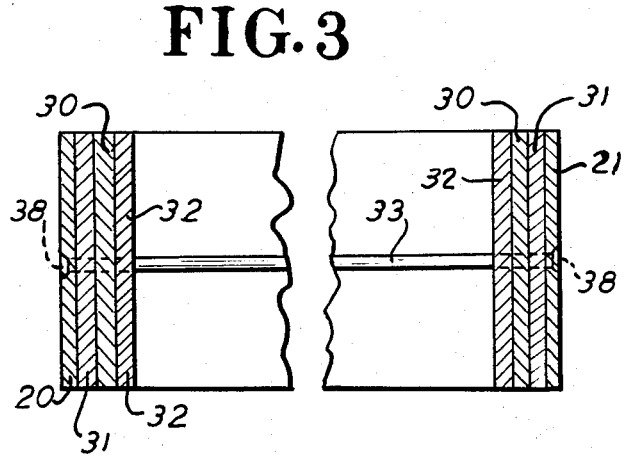
FIG. 3 is a fragmentary, similar view, of a further form of said device.
Figure 6:
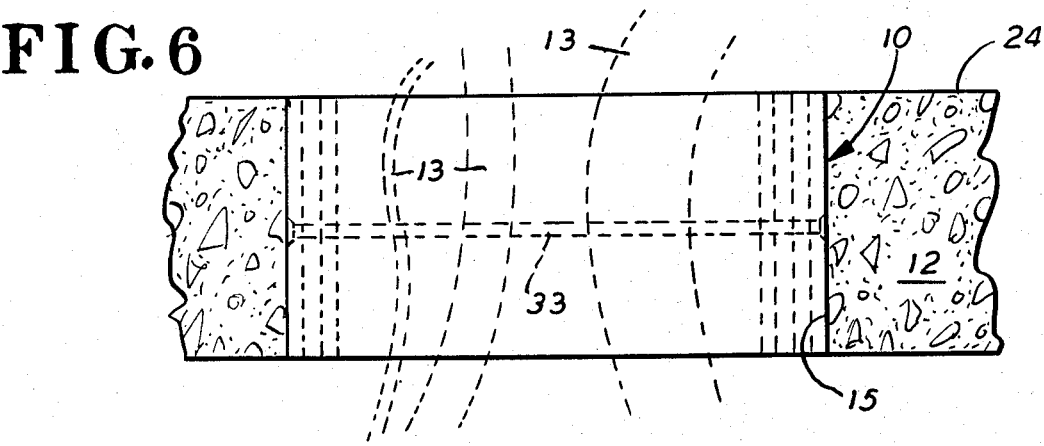
FIG. 6 is a vertical, elevational, partly fragmentary view, showing a device of the invention positioned in an opening in a floor or wall structure.
Figure 7:
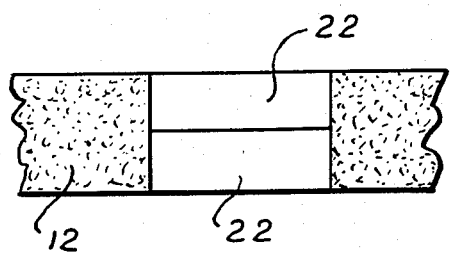
FIG. 7 is a vertical elevational, partly fragmentary view showing a pair of casings of the invention positioned in vertical relation in an opening in a floor.
Figure 8:
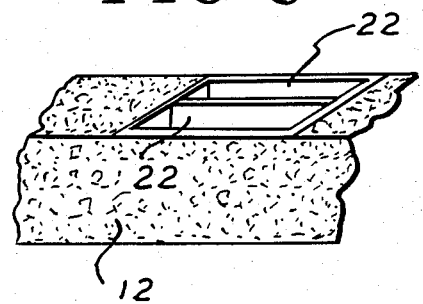
FIG. 8 is a similar view of the casing in laterally adjacent reletion.

The invention comprises a device 10 (FIG. 1) positioned in an opening 15 (FIG. 6) in a floor or wall 12 of cement or other suitable material, molded or otherwise formed or fabricated, through which communication or power cables or wires 13 may be passed; said cables may be of any desired (FIG. 6) diameter and structure and configuration. The device 10 of the invention is provided with a plurality of sealing plate members, which may be equal to, larger than or smaller than, the spaced parallel walls 20,21 (FIG. 1) of casing 22. Said casing 22 may be made of suitable material and may be rectangular, as shown, or otherwise formed, pursuant to and within the scope of the invention, and may be provided with means for orienting the sealing plate members for automatic guided sliding movement therein. Said plates, as shown in FIGS. 1-3 are preferably formed of metal or other heat-conducting material and provided with a layer or coating of material readily intumescing when subjected to highly elevated temperatures, to expand and move the plates and seal the cables and casing in the structure 12 (FIGS. 6-8).

Figure 1:
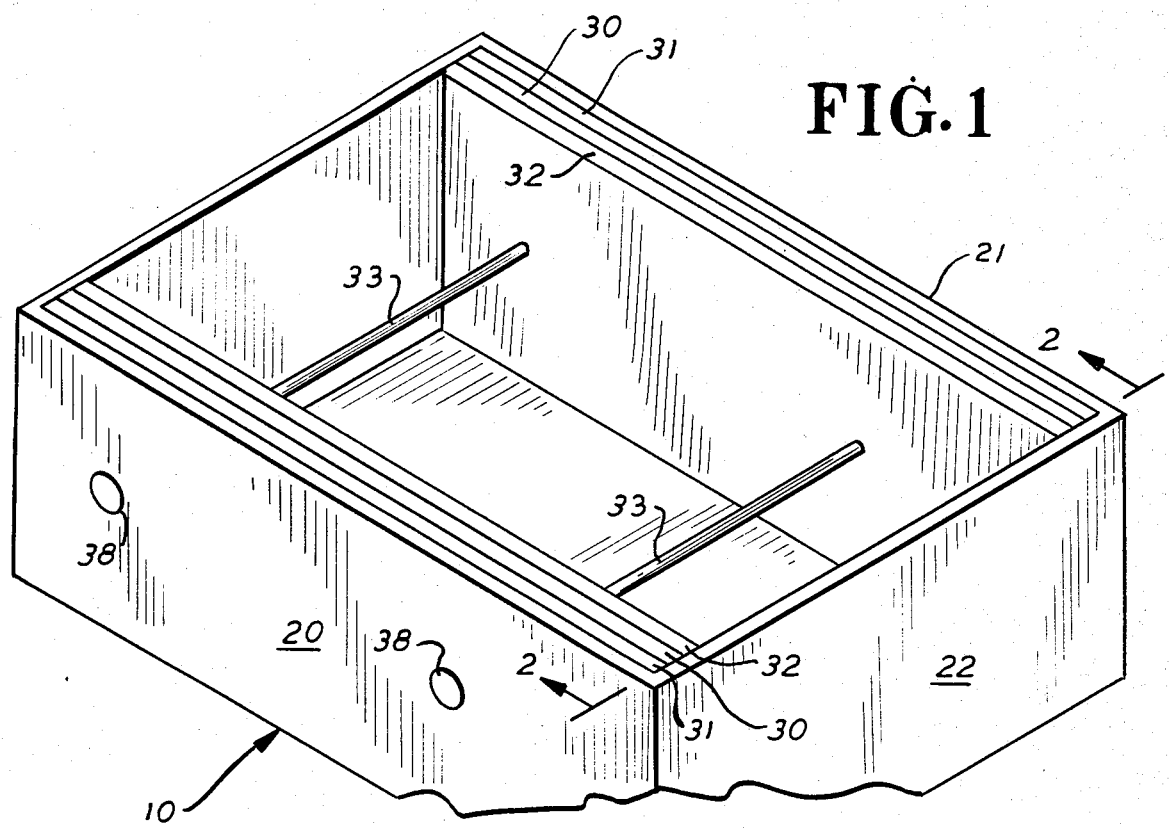
FIG. 1 is an isometric, plan view, of a device embodying the invention.

The sealing plate members (which may be of any desired number) may as shown in FIG. 1 by way of example, and without limitation thereto, comprise a pair of sealing plate members 30, which may be made of firm and stable form, such as for example, of metal. Outer intumescent plates or coatings 31 and 32 may be formed separately or suitably secured to the faces of sealing plates 30; the latter may be initially positioned adjacent the inner faces of the end walls 20, 21 of casing 22 (FIGS. 1 and 2) and oriented on support means of any desired or convenient contour and form. Said support means, may (FIG. 1) comprise one or more guide bars 33, on which the sealing plates may be readily positioned. To that end, the plates may (FIG. 4) be formed with apertures such as 34, 35, and the end walls 20, 21 of the casing 22 may be formed with similar apertures 36, 37, rods or guide bars 33 passing through the apertures in the plate assemblies, said guide bars having their opposite ends flattened or otherwise registered with or secured to the end walls 20, 21, of the casing as shown at 38. Any other plate guiding and positioning means may be used as desired. The parts are proportioned so that the sealing plate members will provide ample intumscent sealing on occurrence of fire or elevated temperature (FIG. 5).

Figure 4:
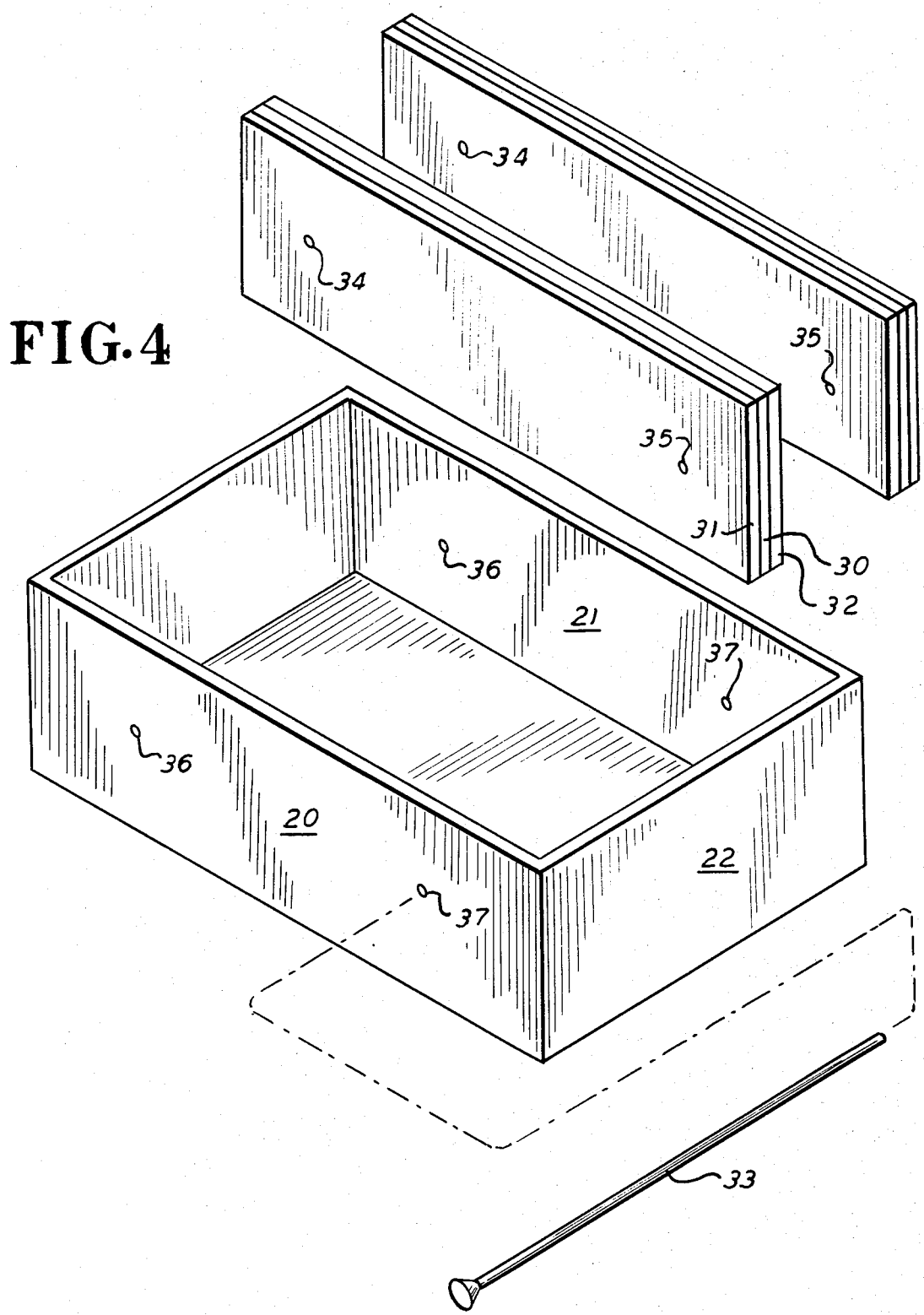
FIG. 4 is an exploded, schematic, isometric view of the device.
Figure 5:
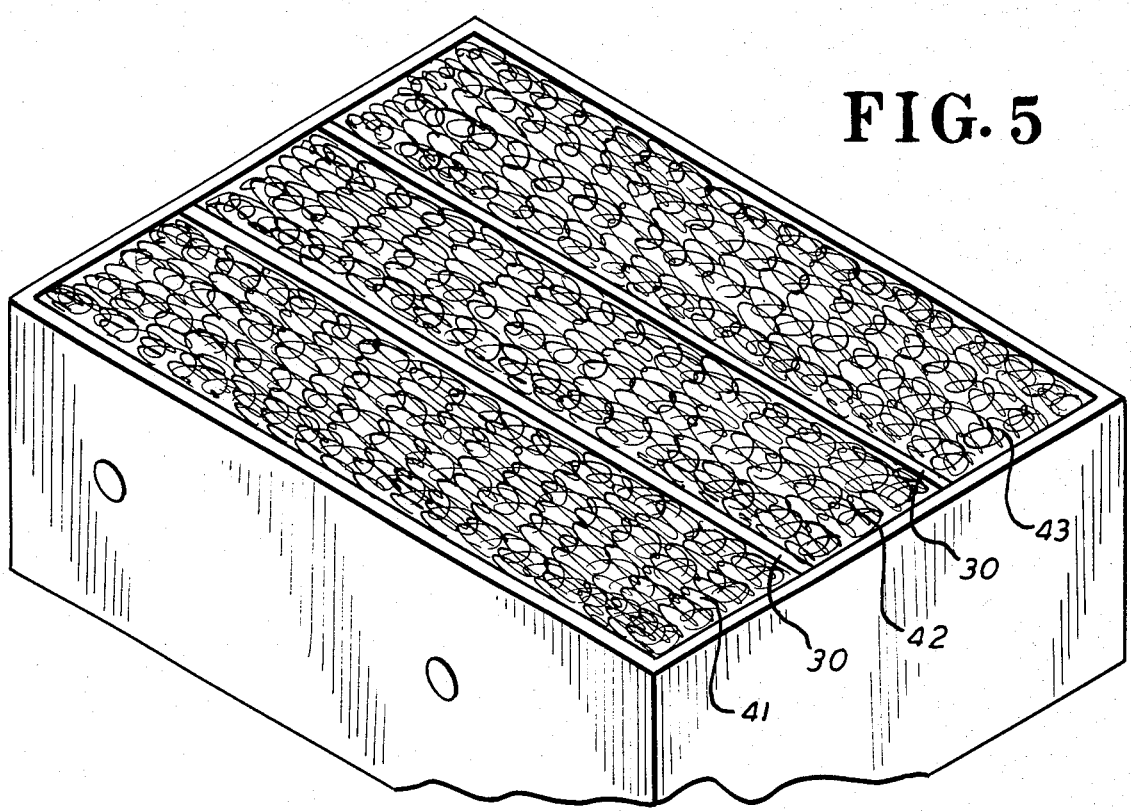
FIG. 5 is a further partly broken, isometric view of the device, automatically sealed and closed on expansion of the intumenscent means, responsive to occurrence of fire or highly elevated temperatures.

In the exemplary form shown in FIG. 4, the end walls 20, 21 of casing 22 are formed of metal or other material, conducting heat to the sealing plate members 30, which preferably also are heat conducting, and conduct heat to their outer intumescent coatings 31, 32, which may be adhered to sealing plate members 30 by being coated thereon or in any other desired or convenient manner. In case of fire or elevated temperature, casing 22 and its end walls 20,21 and preferably also, the guide bars 33, conduct heat immediately to sealing plate members 30, which due to expansion of the intumescent coatings, move and slide on bars 33, filling the casing (FIG. 5) and sealing the cables therein and sealing the opening 15 in wall 12 so as to form, with the wall an essentially monolithic, intumescent solid sealing fire wall or barrier 42. If burning away of the cable insulation occurs, in the case of fire, the intumescing coatings 31,32, expanding and flowing, press onto and through the cable insulation and press on and encapsulate the center conductor core or wire of the cables.

In the case of fire, the insulation sheath or cover enclosing copper or other conductor, burns off, leaving an open gap around the wires which would serve as a heat, fire and smoke conductor. Pursuant to the invention, however, the elevated temperatures which burn off the wire insulation simultaneously activate the intumescent plates and coatings of the invention, causing them to expand and to thereby compress the cable cores tightly therewith, and sealing them therein and forming a fire-wall and barrier against passage of heat, smoke and flame.

It will become apparent, from the disclosures herein, that the invention may be utilized in many forms, such as shown in FIG. 3, wherein the end walls 20,21 are provided, on their inner faces, with intumescent coatings or plates 31,32 on occurrence of fire or highly elevated temperatures, the coatings 31,32 automatically expand and move the plate members 30 inwardly; the coatings 31,32 expand, with the continued resultant automatic sealing and closing action described above.

Figure 3A:
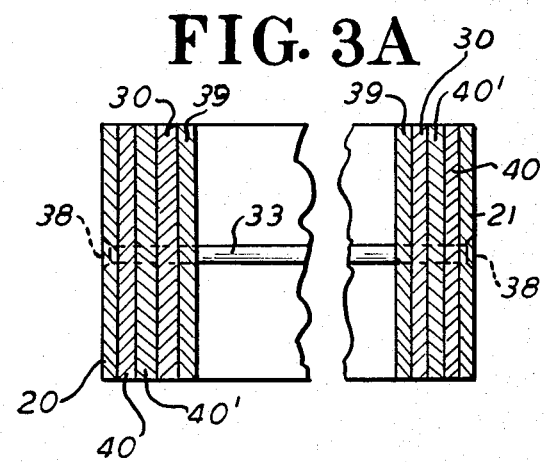

If desired, further plate members and further intumescent coatings may be formed and provided. In FIG. 3A the inner faces of the end walls 20,21 of casing 22 are provided with intumescent coatings 40, and the plates 30 are provided with intumescent coatings 39,40'. Said intumescent coatings expand on occurrence of fire or highly elevated temperatures, moving plate members 30 inwardly and expanding to effectuate the sealing, closing action above described. The casing 22 may be of any outline and contour desired-circular, oval, etc., and may be used in multiple or "stacked" units disposed vertically or horizontally (FIGS. 7 and 8) or in other multiple combinations of vertical or horizontal or both forms.

Figure 9:
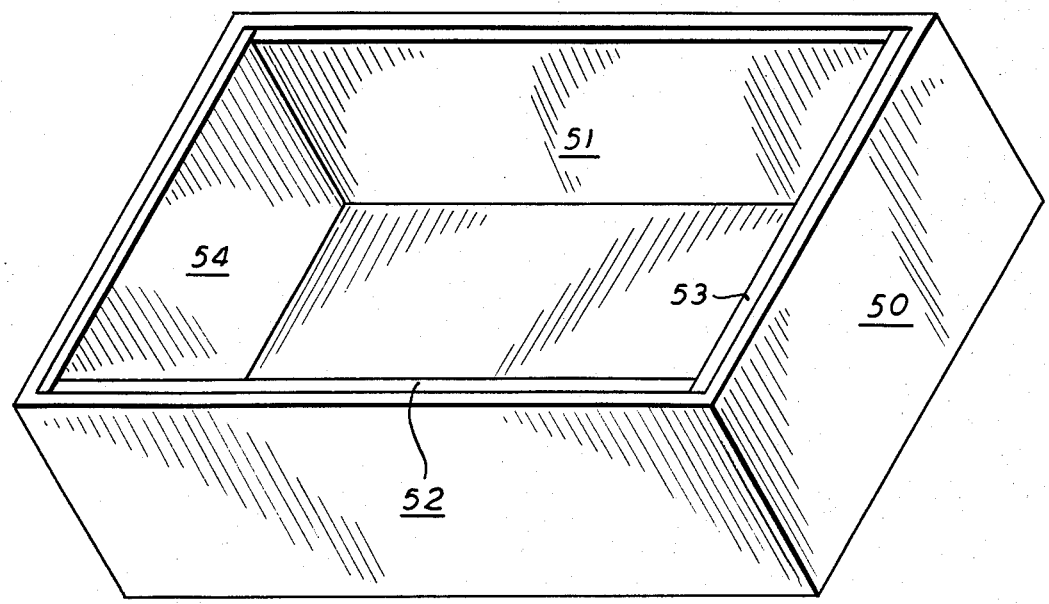
FIG. 9 is an isometric view of a further form of the invention.
Figure 10:
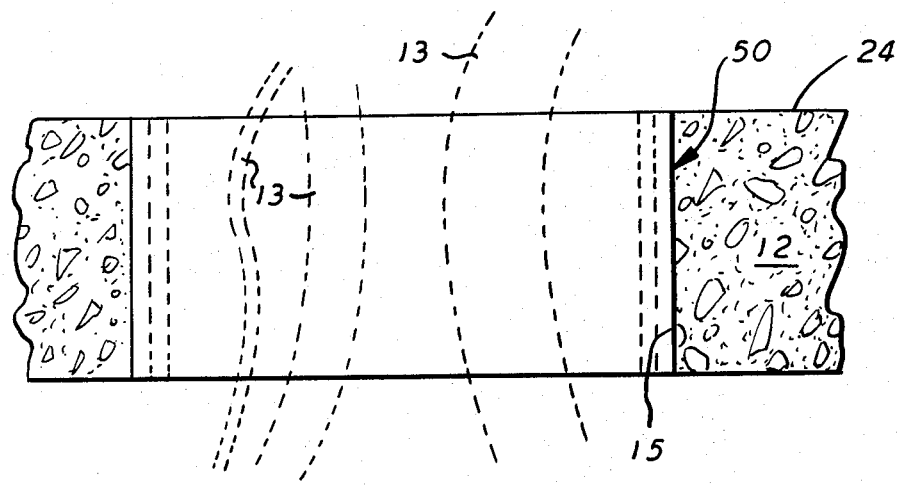
FIG. 10 is a fragmentary, vertical, sectional, elevational view, showing a device of the invention positioned in an opening in a floor or wall structure.

In FIG. 9 form the device of the invention is shown as comprising a rectangular casing 50,(or of circular or of any other convenient or desired forms, for positioning in an opening 15 (FIG. 10) of a wall, floor, etc. 24 of a structure. Intumescent plates or coatings 51,52,53,54 may be sprayed, adhered or otherwise applied to interior areas of casing 50, such as to opposed interior side or end walls thereof, or to all of the interior side and end walls as shown in FIG. 9. The coatings 51–54 may be in the form of plates of intumescent material such as plates 31,32,35,40, previously herein described. The casing 50 may be of any suitable poor or good heat conducting material, an example of the latter being light gauge steel, in which event the casing will accelerate the rapid elevation and therefore intumescene and foaming expanding of the coatings of plates 51–54, which will rapidly intumesce and foam, filling the interior of casing 50 and sealing the cables and wires 13 (FIG. 10) passing therethrough, and sealing the casing 50 in the opening 15 in the structural member 24 wherein it is positioned. The casing 50 may be formed of suitable non-metallic material, in which case the heat carried by cables and heat passing through the interior of the casing will activate the coatings or plates 51–54 which will intumescent and foam and fill the interior of casing 50, achieving essentially a firewall closure thereof and of the opening 15 in structural member 24 in which it is positioned.

If fire occurs in installations embodying the invention, the intumescent coatings automatically and rapidly foam within and around the device 10 and effectively close the device and opening 12 wherein it is positioned, thus providing as essentially solid fire wall and monolithic barrier in the structure and prevent flame or elevated temperatures from passing through.

The thermally expansible coatings referred to are preferably made of material which will automatically expand and foam under pressure when exposed to fire or to substantially highly elevated temperatures. A material which I have found highly suitable for that purpose is water glass, which foams and creates tremendous pressures on occurrence of fire or highly elevated temperatures, the foam flowing into and sealing all voids and effectively preventing passage of flame and excess temperatures therethrough. The water glass material described is inorganic hydrated sodium silicate. At about 200° C., the water-vapor escapes, leaving a thermally insulating layer of foam material having a denisty of 0.1 to 0.2 g/m 3. It is a compound of sodium, silicon, hydrogen and oxygen, ensuring the automatic movement of the plate members and their expansion inwardly and outwardly as indicated at 41, 42 (FIG. 5) closing casing 10 and closing the opening 15 (FIG. 6) and pressing onto and through the insulation of the cables, automatically sealing the cables in the device and sealing the device and wall opening against passage of excess heat or fire therethrough.

While the present invention has been exemplified herein in specific embodiments thereof, variations may be made by those skilled in the art in view of the disclosures herein, shall be deemed to be within the scope of the invention. and shall be broadly construed to be within the scope and spirit of the appended claims.

I claim:

1. An automatic cable sealing device for positioning in a floor or other opening through which cables may be passed, to automatically protect and seal said cables therein on occurrence of excess heat or fire, said device comprising:
    (a) a hollow casing, to be positioned in said opening,
    (b) guide means in said casing,
    (c) a first automatically sealing plate movably disposed on said guide means for movement of said plate therein, and
    (d) a thermally activated expanding fire sealing coating on said plate,
    whereby said sealing plate coating will automatically form and expand under pressure when exposed to fire or substantially highly elevated temperatures, automatically moving into position and flowing and closing said casing and closing onto and sealing said cables therein and sealing the floor or wall opening wherein the casing is positioned.

2. In an automatic cable conduit device as set forth in claim 1,
    a second automatic fire sealing plate engaging said guide means,
    and a thermally activated fire sealing coating on said second plate.

3. In an automatic cable conduit device as set forth in claim 1, said casing being non-circular.

4. In an automatic cable conduit device as set forth in claim 1,
said casing being rectangular.

5. In an automatic cable conduit device as set forth in claim 1,
said casing having spaced end walls, and
said guide means being secured to and extending intermediate the end walls.

6. In an automatic cable conduit device as set forth in claim 1,
said casing having spaced end walls, and
said guide means comprising guide bars secured to and extending intermediate said end walls.

7. In an automatic cable conduit device as set forth in claim 1,
said guide means comprising guide bars secured to said casing and extending interiorly thereof intermediate the walls of said casing and in parallel spaced relation.

8. In an automatic cable conduit device as set forth in claim 1,
said guide means comprising guide bars extending interiorly crosswise of the casing and freely passing through said plates.

9. In an automatic cable conduit device as set forth in claim 1,
an intumescent coating on said fire sealing plate.

10. In an automatic cable conduit device as set forth in claim 1,
said sealing plate being of non-intumescent material.

11. In an automatic cable conduit device as set forth in claim 1,
said sealing plate being of metallic material.

12. In automatic electric cable conduit sealing device as set forth in claim 1,
spaced guide means in said casing for movement of said sealing plate thereon.

13. In an automatic cable conduit device as set forth in claim 1,
said fire sealing plate being thermally sensitive.

14. In an automatic cable conduit device as set forth in claim 1,
said fire sealing means being waterglass means.

15. In an automatic cable conduit device as set forth in claim 1,
said plate being rectangular.

16. In an automatic cable conduit device as set forth in claim 1,
said plate being slidably disposed on said guide means.

17. In an automatic cable conduit device as set forth in claim 1,
said casing having end walls,
means connecting said end walls in spaced parallel relation,
said plate and guide means being complementarily formed for so movably disposing the plate on said guide means intermediate the end walls of the casing.

18. In an automatic cable conduit device as set forth in claim 1,
a second guide means in said casing,
a second automatic fire sealing plate engaging said second guide means,
and a thermally activated fire sealing coating on said second plate.

19. An automatic sealing device for positioning in a floor or wall opening through which cables may be passed, to automatically protect floor or wall and seal said cables therein occurrence of excess heat or fire, said device comprising:
(a) a hollow casing, to be positioned in said opening,
(b) guide means in said casing,
(c) sealing plates movably disposed on said guide means for movement of said plates in said casing, and
(d) one or more thermally active expanding coatings on each plate,
whereby said fire sealing plate coatings will automatically foam and expand under pressure when exposed to fire or substantially highly elevated temperatures, automatically moving into position and flowing and closing said casing and sealing said cables therein and in the floor or wall opening wherein the casing is positioned.

20. In an automatic cable conduit device as set forth in claim 19,
said casing being non-circular.

21. In an automatic cable conduit device as set forth in claim 19,
said casing being rectangular.

22. In an automatic cable conduit device as set forth in claim 19,
said casing having spaced end walls and said guide means being secured to said end walls and extending intermediate the same.

23. In an automatic cable conduit device as set forth in claim 19,
said casing having spaced end walls, and
said guide means comprising guide bars secured to and extending intermediate said end walls.

24. In an automatic cable conduit device as set forth in claim 19,
said guide means comprising guide bars secured to said casing and extending interiorly thereof intermediate the walls of said casing and in parallel spaced relation.

25. In an automatic cable conduit device as set forth in claim 19,
said guide means comprising guide bars extending interiorly crosswise of the casing and passing through said plates.

26. In an automatic cable conduit device as set forth in claim 19,
said fire sealing plates having intumescent coatings.

27. In an automatic cable conduit device as set forth in claim 19,
said plates being made of non-intumescent material.

28. In an automatic cable conduit sealing device as set forth in claim 19,
guide means in said casing for spaced parallel movement of said plates thereon.

29. In an automatic cable conduit device as set forth in claim 19,
said fire retarding means being waterglass means.

30. In an automatic cable conduit device as set forth in claim 19,
said fire retarding plates being rectangular.

31. In an electric cable conduit device as set forth in claim 19,
said casing having end walls,
means connecting said end walls in spaced parallel relation, said guide means being so disposed in said casing intermediate the end walls, and said plates and said guide means being complementarily formed for so movably disposing the plates on said guide means and intermediate the end walls.

32. A device for enabling passage of a cable therethrough, adapted to prevent passage of fire, smoke, or gas therethrough, comprising:
(a) means for preventing passage of fire, smoke, or gas through the device, comprised of intumescent material, adapted to be movably positioned in the device, comprising a sheet of intumescent material, having an opening therein for enabling the sheet to be movably positioned; and
(b) means for movably positioning the preventing means in the device, adapted to enable the preventing means to be initially movable along a guided path into a position permitting a cable or a plurality of cables to extend loosely through the device, and to be automatically movable along a guided path upon intumescing of the intumescent material into a position closer to the cable or cables, for filling and sealing the device and sealing the cables under pressure, and further adapted to form a path for conducting heat to the intumescent material, comprising a frame, adapted to be positionable on a support surface, and a rod, mounted in the frame and extending lengthwise therein, on which the preventing means are adapted to be movably mounted, adapted to guide movement of the preventing means, the frame and rod being comprised of heat-conducting material.

33. A device as in claim 32, in which the frame and rod are comprised of metal.

* * * * *